United States Patent
Fallon et al.

(10) Patent No.: US 7,677,305 B2
(45) Date of Patent: Mar. 16, 2010

(54) RING REDUCTION VIA NATURAL ANAEROBIC MICROBIOLOGICAL ACTIVITY FOR TRANSFORMATION OF CRUDE OIL-ASSOCIATED AROMATIC CHEMICALS

(75) Inventors: Robert D. Fallon, Elkton, MD (US); Scott Christopher Jackson, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/194,734

(22) Filed: Aug. 20, 2008

(65) Prior Publication Data

US 2009/0050315 A1    Feb. 26, 2009

Related U.S. Application Data

(60) Provisional application No. 60/957,794, filed on Aug. 24, 2007.

(51) Int. Cl.
*E21B 43/22* (2006.01)
(52) U.S. Cl. .................................... 166/246
(58) Field of Classification Search ............. None
See application file for complete search history.

(56) References Cited

U.S. PATENT DOCUMENTS

| | | | |
|---|---|---|---|
| 6,376,123 B1 | 4/2002 | Oda et al. | |
| 6,543,535 B2 * | 4/2003 | Converse et al. | 166/246 |
| 6,905,870 B2 | 6/2005 | Brown et al. | |
| 7,472,747 B1 * | 1/2009 | Brigmon et al. | 166/246 |

FOREIGN PATENT DOCUMENTS

DE    19935156    5/2000

OTHER PUBLICATIONS

Oren et al., Applied and Environmental Microbiology, vol. 57, No. 11, pp. 3367-3370, Nov. 1991.
Coates, Applied and Environmental Microbiology, vol. 63, No. 9, pp. 3589-3593, Sep. 1997.
International Search Report and Written Opinion of related PCT/US2008/073944 mailed Jan. 21, 2009.
Grishchenkov et al., Appl. Biochemi. Microbiol., 2002, vol. 38:125-128 (Translation of Prikladnaya Biokhimiya I Mikrobiologiya).
Eyssen et al., Biohydrogenation of Sterols by Eubacterium ATCC 21,408-Nova Species, Eur. J. Biochem., 1973, vol. 36:411-421.
Lovley et al., Humic Substances As Electron Acceptors for Microbial Respiration, Nature, 1996, vol. 382:445-448.
Dos Santos et al., The Contribution of Fermentative Bacteria and Methanogenic Archaea to Azo Dye Reduction by a Thermophilic Anaerobic Consortium, Enzyme and Microbial Technology, 2006, vol. 39:38-46.
F. Foroughi et al., Reduction of Carbon-Carbon Double Bonds Using Acetobacterium Woodii, Determination of the Optimum Inducer Structure, Enzyme and Microbial Technology, 2006, vol. 39:1066-1071.
V. Tandol, Environ. Reductive Dehalogenation of Chlorinated Ethenes and Halogenated Ethanes by a High-Rate Anaerdoic Enrichment Culture, Sci. & Technol., 1994, vol. 28:973-979.
M. Safinowski et al., Methylation Is the Initial Reaction in Anaerobic Maphthalene Degradation by a Sulfate-Reducing Enrichment Culture, Environ. Microbiol., 2006, vol. 8:347-352.
E. Annweiler, Appl. Anaerobic Cometabolic Conversion of Benzothiophene by a Sulfate-Reducing Enrichment Culture and in a Tar-Oil Environ. Microbiol., 2001, vol. 67:5077-5083.
M. Safinowski et al., Anaerobic Cometabolic Transformation of Polycyclic and Heterocyclic Aromatic Hydrocarbons, Evidence From Laboratory and Field Studies, Environ. Sci. Technol., 2006, vol. 40:4165-4173.

* cited by examiner

*Primary Examiner*—Zakiya W. Bates

(57) ABSTRACT

Methods of reducing the viscosity of crude oil in an oil well are provided. The methods comprise the introduction of at least on reductant to an injection fluid which is then injected into the well. Aromatic hydrocarbons in the oil are reduced in the presence of reductant and indigenous microbial populations to reduce the viscosity of the oil.

22 Claims, 1 Drawing Sheet

Figure 1:
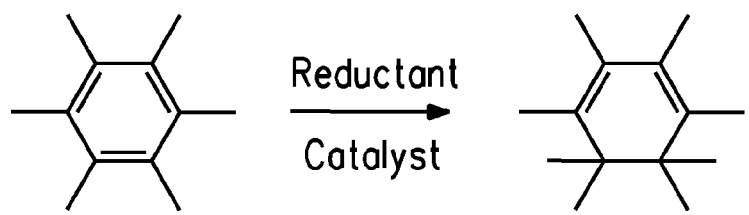

RING REDUCTION VIA NATURAL ANAEROBIC MICROBIOLOGICAL ACTIVITY FOR TRANSFORMATION OF CRUDE OIL-ASSOCIATED AROMATIC CHEMICALS

FIELD OF THE INVENTION

The field of the invention is in the art of reductive transformation of environmental chemicals via natural anaerobic microbial activity. We describe a process to induce reductive transformation via endogenous anaerobic microbial populations in an oil reservoir, especially the transformation of aromatic compounds. In addition we describe a technology to chemically reduce aromatic compounds. These processes are best applied in transforming chemicals associated with crude oil and crude oil recovery where such reductive transformations of aromatic compounds can improve oil recovery.

BACKGROUND OF THE INVENTION

Crude oil is a complex mixture. Standard analytical techniques used to fractionate this mixture show that crude oil is composed of a variety of hydrocarbon chemistries. Paraffinic and aromatic components may contribute to the viscosity, "heaviness", of the crude oil (Hyne, N.J. 2001, "Non-technical guide to petroleum geology, exploration, drilling, and production", 2nd edition, Pen Well Corp., Tulsa, Okla., USA). Heavy oil is more difficult to recover than light oil. Improved oil recovery depends on the improved flow of the oil through the porous reservoir media to the production well. Flow improvement can be achieved in a number of ways. Administering a second fluid to the reservoir, such as water, to push the oil through the formation has been utilized. Injection of water, often called waterflooding, is commonly used to improve oil recovery in the middle to late stages of the life of an oilfield (Hyne, N.J. 2001, "Non-technical guide to petroleum geology, exploration, drilling, and production", 2nd edition, Pen Well Corp., Tulsa, Okla., USA). Techniques to reduce oil viscosity have also been used in addition to, or independently, of water flooding to improve oil flow. Reduction of oil viscosity may be achieved by physical or chemical means. Increasing the oil temperature via techniques such as fire flooding or steam injection will reduce viscosity, improving flow, (Hyne, N.J. 2001, supra), but in most situations, the vast amount of heating required to mobilize the reservoir will be too costly. In addition, in regions where reservoirs exist near permanent frozen surface strata, e.g. permafrost, such heating can result in the undesirable melting and collapse of the surface strata. Viscosity reduction has also been achieved through in situ biological modification of oil chemistry. This process is dependent on the addition of an inoculum of industrially produced aerobic (oxygen dependent) microbes that degrade long chain paraffins in the oil (for example, U.S. Pat. No. 6,905,870 B2). However, pumping air into the formation is costly and oxygen is highly corrosive to most equipment used in the oil field. Also, oil dominated by aromatic compounds cannot be modified by the described biological process because the microbial modification is specific to straight chain compounds. Yet, pi-bond interactions in aromatic compounds will contribute to oil viscosity (Sygula, A., J. Am. Chem. Soc., 129, 3842-3843, 2007).

Microbial transformation by reduction of organic compounds has been observed in various environments. Cholesterol is reduced to coprostanol in the gut by microbes, including the genus *Eubacterium* (Eyssen, H J et al Eur. J. Biochem. 36, 411-421, 1973). Humic acids in soils are reported to act as electron acceptors for anaerobic microbial respiration (Lovley D R et al., Nature, 382, 445-448,1996). Microbial reduction of azo compounds has been used to remove color from aqueous wastes (dos Santos, A B et al Enzyme and Microbial Technology. 39: 38-46, 2006). Some members of the genus *Acetobacterium* are reported to reduce acrylic groups in cinnamate derivatives (Foroughi, F et al., Enzyme and Microbial Technology. 39, 1066-1071, 2006). Microbial reduction of halogenated compounds under anaerobic conditions also serves as an important application in bioremediation for environmental pollutants (e.g. Tandol, V Environ. Sci. & Technol., 28, 973-979,1994). As reflected in these reports, microbial transformation by reduction of polyaromatic compounds is not known to the art of biochemical transformation by natural microbial populations.

Transformation of polyaromatic compounds to alicyclic compounds has been described from pure culture experiments in the laboratory (Safinowski, M and Meckenstock R U, Environ. Microbiol., 8, 347-352, 2006). For example, 5, 6, 7, 8-tetrahydro-2-naphthoic acid is reported in cell extracts from anaerobic sulfate reducers during the degradation of aromatic derivatives (Annweiler, E Appl. Environ. Microbiol., 67, 5077-5083, 2001), but evidence for such transformations is rarely found in the environment (Safinowski, M et al Environ. Sci. Technol. 40, 4165-4173, 2006). The process described herein is designed to encourage the development of natural microbial populations that will promote reduction of aromatic compounds associated with oil.

Previous microbial approaches to aromatic modification have generally used oxidative microbial metabolism. In an environment with excess organic matter, such as an oil reservoir, oxidizing agents such as oxygen or nitrate will be scavenged by microbes that are not active in aromatic modification. This lowers the efficiency of oxidant usage for aromatic modification. In contrast the reductants described in this case are not scavenged for organic matter oxidation, which leads to a more efficient microbial aromatic modification process. In addition, oxidative microbial metabolism often leads to hydrocarbon degradation, which can result in decreased oil recovery (Grishchenkov, V G et al Appl. Biochemi. Microbiol. (Translation of Prikladnaya Biokhimiya i Mikrobiologiya, 38,125-128, 2002). Reductive transformation does not cause hydrocarbon degradation.

Biochemical reduction of aromatic compounds in oil requires a reductant with a relatively low equilibrium redox potential, $E_H$. Therefore, the reductants used to drive aromatic reduction must be able to supply electrons at a low redox potential. CO and $H_2$ are examples of such reductants that can also be easily generated from precursors available at the oil well site such as natural gas and air. In addition, CO is also available to only a restricted group of anaerobic microbes, and therefore encourages the development of desirable populations. However, other materials that are good sources of low potential electrons, for example, formic acid, formate, 2-methoxy ethanol or sodium lactate or mandellic acid, or trimethylamine or ethylene glycol, may also be used to drive biochemical reduction of aromatic compounds.

Thus there is a need for developing means to reductively transform environmental chemicals particularly aromatic constituents of an oil reservoir to assist crude oil recovery.

SUMMARY OF THE INVENTION

The methods herein are directed to modifying aromatic components of crude oil found in subsurface reservoirs. Injection water is used as a carrier to bring amendments to the subsurface reservoirs. Such amendments encourage the development of natural microbial populations and biochemical activity capable of reductively transforming aromatic components associated with the crude oil. Modification of the aromatic components results in improved oil recovery Specifically, a method for reducing aromatic hydrocarbons in an oil well is provided, said method comprises:

a) providing injection water for injection into said oil well;

b) adding to the injection water of (a) one or more reductants capable of reducing aromatic hydrocarbons in an oil well; and c) injecting the water and one or reductants into said oil well, wherein reduction of aromatic hydrocarbons in said oil well occurs by the action of one or more anaerobic microbial populations present in said well. The one or more anaerobic populations may be present in said well as an indigenous population, or may be provided in said injection water.

In another aspect, the method further comprises the step of adding nutrients to the injection water prior to injection in said well, wherein said nutrients promote growth of one or more anaerobic populations in said well.

In another aspect, specific reductants include $H_2$ or CO which are added to the oil injection water as described above. This brings about development of microbial populations and microbial activity that causes biochemical reduction of aromatic compounds in the oil reservoir formation. The reductants are administered to the underground oil reservoir by adding them to the injection water at depth, maximizing dissolution of the gas into the injection water. As the injection water continues to flow through the formation to the production well, these reductants promote the growth of the desired microbial populations and their ability to reduce aromatic components of the crude oil. In addition, small amounts of microbial nutrients are added to the injection water to enhance the desired microbial activities.

Accordingly one aspect of the method described herein, is the addition to an oil well of one or more reductant chemicals, that can be used by the anaerobic microbial population in the oil well, to bring about reduction of aromatic compounds in crude oil. In this method nutrients are added to enhance the reductive activities of the microbial population.

In another aspect, a method is provided wherein one or more reductants capable of reducing aromatic hydrocarbons, added to the oil well, with nutrients, cause a 1-12% reduction in the relative percentage of the aromatic carbons in the hydrocarbons by the reductive reactions of the anaerobic microbial population in the oil well.

In yet another aspect a method is provided wherein one or more reductants capable of reducing aromatic hydrocarbons, and nutrients added to the oil well cause a 1-5% increase in the relative percentage of saturated carbons in the hydrocarbons is brought about by the reductive reactions of the anaerobic microbial population in the well.

DEFINITIONS

The term "reductive transformation" means any chemical change that produces the desired product which has a lower equilibrium redox potential than the parent chemical.

The term "capable of biochemically producing low potential reducing equivalents" means a reductant with relatively low equilibrium redox potential ($E_H$) that can by used by anaerobic microorganisms to biochemically reduce an aromatic hydrocarbon.

The term "aromatic" refers to a chemical compound that contains a closed loop of electrons in a ring, most commonly a closed loop of six electrons, that has the feature of being diatropic.

The term "azo compounds" means compounds with general molecular formula of R—N=N—R', in which R and R' can be either aromatic or aliphatic.

The term "paraffinic" refers to a chemical compound that contains chains of carbon molecules lacking a closed loop of electrons and generally saturated with covalently bonded hydrogen molecules.

The term "oil reservoir" refers to an oil well or reservoir that is a subsurface zone that produces oil and/or gas and lacks communication other reservoirs. As used in the claims, "oil well" and "oil reservoir" are interchangeable.

The term "oil formation" refers to a mappable rock layer having a defined top and bottom that contains oil in the pore spaces The term "injection water" refers to water pumped down into a producing reservoir for pressure maintenance, water flood or enhanced oil recovery.

The term "production water" refers to water associated with oil recovered from the production well.

The term "humic acid" means one of the major components of humic substances which are dark brown and major constituents of soil organic matter humus that contributes to soil chemical and physical quality and are also precursors of some fossil fuels.

The term "reductant" means a substance capable of bringing about the reduction of another substance as it itself is oxidized.

The abbreviation "NMR" refers to Nuclear magnetic resonance spectrometry.

The abbreviation "GC/MS"—refers to Gas chromatorgraphy/mass spectrometry.

The term "centipoise" is a measurement of viscosity. For example water has a viscosity of 0.0089 poise at 25° C., or 1.0 centipoise at 20° C.

The abbreviation "psi" refers to pressure per square inch. Other abbreviations used in this application are as follows: "μ" means micron; "hr" means hour(s), "min" means minute(s), "mL" means milliliters, "mg/L" means milligram per liter; "V/V" means volume per volume; "W/W" means weight per weight; "° C." means degrees Celsius, "V/W" means volume per weight; "mMolar" means millimolar; "μMolar" means micromolar; "nMolar" means nanomolar; "μg/L" means microgram per liter; "mm" means miilimeter; "p" means para; "MHz" means mega Hertz; "kHz" means killo Hertz; "Hz" mean Hertz and is unit of frequency; "ppm" means parts per million; "sec" means second; "F" means degrees temperature in Fahrenheit.

BRIEF DESCRIPTION OF THE FIGURES OF THE INVENTIONS

The invention can be more fully understood from the following detailed description and figures which form part of this application FIG. 1—Is an example of pi bond removal from an aromatic compound via a reductive transformation.

Figure 2:
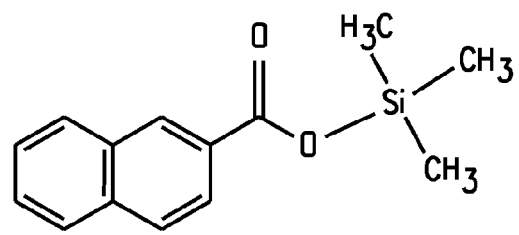

FIG. 2—Parent Substrate, 2-naphthoic acid (as trimethyl silane derivative).

Figure 3:
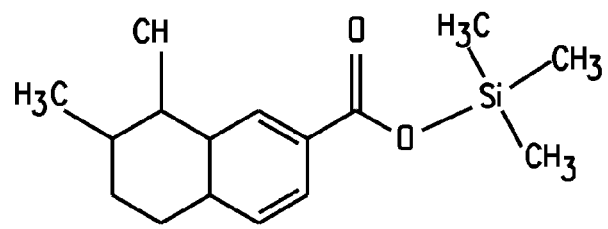

FIG. 3—Reduced Daughter Product 1 (as trimethyl silane derivative).

Figure 4:
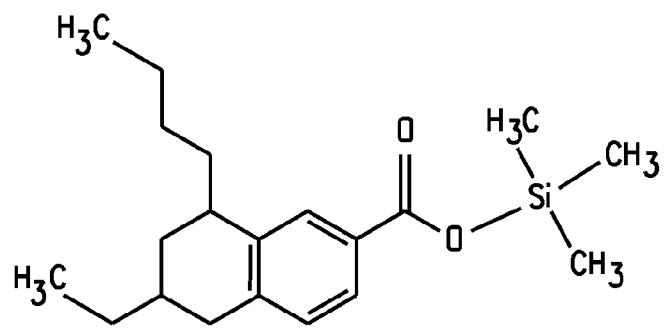

FIG. 4—Reduced Daughter Product 2 (as trimethyl silane derivative).

DETAILED DESCRIPTION OF THE INVENTION

The methods herein are directed to modifying aromatic components of crude oil found in subsurface reservoirs. Injection water is used as a carrier to bring amendments to the subsurface reservoirs. Such amendments encourage the development of natural microbial populations and biochemical activity capable of reductively transforming aromatic components associated with the crude oil. Modification of the aromatic components results in improved oil recovery.

Removing pi bonds from aromatic compounds in oil will lower oil viscosity. Reduction of the pi bonds in an aromatic molecule reduces its pi-pi interactions with neighboring aromatic molecules, thus lowering viscous forces. Reduction of an aromatic molecule, sometimes called hydrogenation, causes breaking of the closed loop of pi electrons in the aromatic molecule by removing a double bond (FIG. 1). Reduction of aromatic compounds in oil requires a reductant with a relatively low equilibrium redox potential, $E_H$. For example, hydrogen, $H_2$, is used in both chemical and biochemical reductions. The kinetics of the reduction reaction is accelerated by using chemical catalysts or biochemical catalysts.

The microbiological process described herein will modify aromatic compounds and overcome the disadvantage of paraffin-specific modification common to previously described processes for microbiological modification of oil. In addition, the biological process described herein depends on natural anaerobic microorganisms common to subsurface formations, which do not require pumping air into the formation, resulting in a less costly process.

In one embodiment of the invention reductants, CO or hydrogen, are added to the injection water to foster the desired microbial activity. Concentrations of these reductants can range from approximately 2% v/v to 10% v/v. Gas injection may be done at depth in the injection well in order to adjust the concentration of gas dissolved in the injection water as determined by one skilled in the art.

Dilute inorganic salt amendments are added to the injection water to aid in maintenance of the desired microbial activity. Inorganic nutrients include a phosphate salt, preferably a potassium or sodium salt, added to the injection water at a preferred rate equivalent to approximately 0.006 to 0.03% w/w of CO added to the injection water. An inorganic ammonium salt, preferably ammonium chloride, is also added to the injection water at a preferred rate equivalent to approximately 0.06 to 0.3% w/w of CO added to the injection water. These amendments are also added in cases where $H_2$ is used as the reductant. Respectively, preferred rates of salt addition are 0.016% to 0.8%%, and 1.6% to 8% w/w of $H_2$ added to the injection water. Inorganic nutrient addition should be limited to a rate that does not damage the reservoir face as indicated by an increase in the injection well pump back pressure greater than 20% of the original. Temperature in the oil reservoir will influence the development of the desired microbial populations. The temperature range for the described process is 25 to 45° C. The process of the invention may be used in reservoirs at or below 70° C. The pH in the reservoir will influence the development of the desired microbial populations. The preferred pH range for the describe process is pH 6 to pH 8.5. The process of the invention may be used in reservoirs between pH 4 and 9.

The salinity in the reservoir will influence the development of the desired microbial populations. The salinity range for the described process is 0.5 to 30 parts per thousand salinity. The process of the invention may be used in reservoirs at or below 50 parts per thousand salinity. Alternative reductants may be added to the injection water in addition to or instead of $H_2$ or CO. Compounds capable of biochemically generating low potential reducing equivalents are suitable as alternative reductants. Formic acid or sodium formate are preferred alternative reductants. In addition, 2-methoxy ethanol or sodium lactate or mandellic acid, or trimethylamine or ethylene glycol could be used as reductants. Alternative reductants are added to the injection water at a rate of 0.1 to 2.0% w/v. Alternative reductant addition should be limited to a rate that does not damage the reservoir face as indicated by an increase in the injection well pump back pressure greater than 20% of the original. From the foregoing description, one skilled in the art can easily ascertain a suitable combination of reductant and/or alternative reductant, inorganic nutrient amendment, reservoir temperature, reservoir pH, and reservoir salinity. The protocol outlined in Example 1 provides a method whereby one skilled in the art can detect microbial reduction of oil-associated aromatics by a particular physical-chemical combination.

Because of the expense of demonstrating this new process at field scale, we have demonstrated the process in the laboratory. In Example 1, below, oil well production water, which includes water that has flowed through the oil formation and contains natural microbial populations common to the formation is amended with reductants and nutrients described above. The desired microbes and microbial activity are shown to develop from these natural populations and carry out biochemical reduction of aromatic compounds common to oil well reservoirs.

EXAMPLES

The present invention is further defined in the following Examples. It should be understood that these Examples, while indicating preferred embodiment of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

General Methods

Production water samples from oil wells in North slope Alaska were obtained. Microbial suspensions from these samples were sealed under anaerobic conditions in glass serum vials and one of two of the following gas mixtures was added to the headspace of the vials.

Treatment #1: $H_2:CO_2:N_2:CH_4$ (1:1:1:7)

Treatment #2: $CO:CO_2:N_2:CH_4$ (1:2:3:14)

The $CO_2:N_2:CH_4$ portion of the gas mixtures mimicked conditions in the oil reservoir. Hydrogen or carbon monoxide provided reductant for the microbes.

The following mineral medium was added to the production water microbial suspension from the oil reservoir at a ratio of 9 parts production water plus 50 parts Mineral Medium #1 (Table 1): $NH_4Cl$, 18.7 mMolar, $KH_2PO_4$, 3.7 mMolar, $MgCl_2.6H_2O$, 984 µMolar, $CaCl_2.2H_2O$, 680 µMolar, NaCl, 172 mMolar, Nitrilotriacetic Acid, 670 µMolar, $FeCl_2.4H_2O$, 15.1 µMolar, $CuCl_2.2H_2O$, 1.2 µMolar, $MnCl_2.4H_2O$, 5.1 µMolar, $CoCl_2.6H_2O$, 12.6 µMolar, $ZnCl_2$, 7.3 µMolar, $H_3BO_3$, 1.6 µMolar, $Na_2MoO_4.2H_2O$, 0.4 µMolar, $NiCl_2.6H_2O$, 7.6 µMolar, HEPES (4-(2-hydroxyethyl)-1-piperazine ethanesulfonic acid), 10 mMolar, $Na_2SeO_3.5H_2O$, 22.8 nMolar, $Na_2WO_4.2H_2O$, 24.3 nMolar, $NaHCO_3$. 23.8 mMolar, Vitamin B12, 100 µg/L, p-Aminobenzoic acid, 80

µg/L, D(+)-Biotin, 20 µg/L, Nicotinic acid, 20 µg/L, Calcium pantothenate, 100 µg/L, Pyridoxine hydrochloride, 300 µg/L, Thiamine-HCl 0.2H$_2$O, 200 µg/L, Alpha-lipoic acid, 50 µg/L, Yeast extract, 25 mg/L, 9,10-anthroqinone-2,6-disulfonic acid, Na salt, 67 mg/L, 2-bromoethane sulfonate, Na salt, 1.0 g/L. In addition, 390 mg/L Na$_2$S.9H$_2$O was added to mineral medium #1 in order to protect anaerobic microorganisms from oxygen toxicity. Mineral medium #1 was bubbled for 20 minutes with the mixture of N$_2$/CO$_2$ (80/20%), sealed in anaerobic vials and autolaved before being combined with the production water microbial suspension. Hydrogen or carbon monoxide provided in the reductant gas mixture, also acted as a source of energy for microbial metabolism. Reductant was consumed over time as a result of microbial metabolism. In order to maintain microbial activity, reductant gas in the headspace was periodically replaced with new reductant gas mixture. After a time sufficient for microbial reductive transformation of the aromatic molecule to have occurred, 4 to 8 weeks, the microbial suspension was removed from the anaerobic serum vial by passing the suspension through a 0.2µ filter. Aromatic components described below were extracted from the aqueous filtrate, adjusted to pH 2 by HCL addition, and passed through solid phase extraction columns, C-18 SPE column (Supelclean™ LC-18 SPE Tubes 1.0 mL, Supelco, Bellefonte, Pa., USA) following the manufacturer's instructions. Aromatic acids recovered from the SPE columns flow through as methanol extracts. Extracts were evaporated to dryness under N$_2$ purge. Following the manufacturer's instructions, 1.0 ml of BSTFA solution containing 1% TMS ((N,o-Bis(Trimethylsilyl) trifluoroacetamide, Supelco, Bellefonte, Pa., USA)) was added to dried sample and then it was heated at 60° C. for 30 min to form the trimethylsilyl derivatives. Derivatized aromatic samples, 2.0 µL, were injected onto an Aglient 6890N/5975MSD (Agilent Technologies, Santa Clara, Calif., USA) system, using a J&W DB-5 (Agilent Technologies) with the dimensions of 30 m long, 0.25 mm ID and a 0.25cm film thickness (cat no 122-5032). Oven profile is 50° C. for 1 min, ramp 20° C./min to 310° C., hold at 310° C. for 15 min monitoring extracted ion 73 (trimethylsilyl fragment) and the total ion chromatogram (TIC). Peaks on the 73 ion and total ion chromatograms were compared to identify compounds present in the test treatments, but not in the control treatments.

TABLE 1

Mineral medium #1

| Chemical Source | Final Concentration | units |
|---|---|---|
| NH$_4$Cl | 18.7 | mMolar |
| KH$_2$PO$_4$ | 3.7 | mMolar |
| MgCl$_2$•6H$_2$0 | 984 | µMolar |
| CaCl$_2$•2H$_2$0 | 680 | µMolar |
| NaCl | 172 | mMolar |
| Nitrilotriacetic Acid | 670 | µMolar |
| FeCl$_2$•4H$_2$O | 15.1 | µMolar |
| CuCl$_2$•2H$_2$O | 1.2 | µMolar |
| MnCl$_2$•4H$_2$O | 5.1 | µMolar |
| CoCl$_2$•6H$_2$O | 12.6 | µMolar |
| ZnCl$_2$ | 7.3 | µMolar |
| H$_3$B0$_3$ (boric acid) | 1.6 | µMolar |
| Na$_2$MoO$_4$•2H$_2$0 | 0.4 | µMolar |
| NiCl$_2$•6H$_2$0 | 7.6 | µMolar |
| HEPES | 10 | mMolar |
| Na$_2$SeO$_3$•5H$_2$O | 22.8 | nMolar |
| Na$_2$WO$_4$•2H$_2$O | 24.3 | nMolar |
| NaHCO3 | 23.8 | mMolar |

TABLE 1-continued

Mineral medium #1

| Chemical Source | Final Concentration | units |
|---|---|---|
| Vitamin B12 | 100 | µg/L |
| p-Amino benzoic acid | 80 | µg/L |
| D(+)-Biotin | 20 | µg/L |
| Nicotinic acid | 20 | µg/L |
| Calcium pantothenate | 100 | µg/L |
| Pyridoxine hydrochloride | 300 | µg/L |
| Thiamine-HCl x 2 H$_2$O | 200 | µg/L |
| Alpha-lipoic acid | 50 | µg/L |
| Yeast extract | 25 | mg/L |
| 9,10-anthroqinone-2,6-disulfonic acid, Na salt | 67 | mg/L |
| 2-bromoethane sulfonate, Na salt | 1.0 | g/L |

Nuclear Magnetic Resolution Spectrometry (NMR)

The NMR spectra were acquired on a Varian Inova Spectrometer (Varian, Inc, Pal Alto, Calif.), operating at 500 MHz for $^1$H NMR and 125 MHz for $^{13}$C NMR. Digitally filtered $^1$H NMR experiments were acquired in 5 mm NMR tubes with 16 transients, using a 90° pulse width, 1.0 second acquisition time, 30 second recycle delay and a spectral width of ~10 kHz. The data was zero filled to 128 k points and 0.3 Hz exponential multiplication. The chemical shift was referenced to the deuterium lock, 1,1,2,2-tetra-chloroethane-d$_2$=5.97 ppm.

The $^{13}$C and $^1$H NMR experiments were performed in 10 mm NMR tubes. The spectra were acquired at 4000 transients, using a ~200 pulse width, 2 sec acquisition time, 5 second recycle delay and a spectra width of 33 kHz. $^1$H decoupling was achieved in an inverse-gated mode to enable reasonable quantification. The data was zero filled to 262 k points and 5 Hz line broadening. Chemical shift was referenced to solvent resonance; tetrachloroethane-d$_2$ (TCE-d$_2$)= 74.1 ppm.

The samples for $^1$H and $^{13}$C analysis were obtained from a stock solution of approximately 1.0 g oil sample, 5.6 g 1,1,2, 2-TCE-d$_2$ and 0.2 g 1,1,1,2-TCE. These samples were vigorously agitated on a Vortex mixer prior to removal of aliquots for analysis. 1,1,1,2-TCE was used as an internal standard to allow comparison of $^1$H to $^{13}$C integrals. An aliquot was transferred to a 5 mm NMR tube for $^1$H experiments. Approximately 80 mg of chromium(III) acetylacetonate (Cracac) (Alfa Aesar, Ward Hill, Mass.) was added to the remainder of the stock solution to act as a relaxation agent to facilitate collection of quantitative $^{13}$-Carbon data and 3.5 mL of the cracac solution was transferred to 10 mm NMR tubes.

Solvents for NMR experiments were purchased from Aldrich Chemical Company (Sigma-Aldrich, Milwaukee, Wis.) and stored over activated molecular sieves for a minimum of 12 hr.

Example 1

Transformation of a Crude Oil Associated Aromatic by Microbial Reduction

To demonstrate biochemical aromatic reductions by natural, oil-well microbial populations the following experiment was carried out. In an anaerobic glove bag 9 mL of Alaskan North Slope oil well production water, which served as the microbial inoculum, were added to 50 mL of mineral medium #1 along with 2.5 mg of 2-naphthoic acid. In addition, controls with the same medium and oil well inoculum, but without 2-naphthoic acid were also set up. Experimental treatments and the controls were all done in duplicate. Microbial suspensions were sealed in glass serum vials and one of two of the following gas mixtures was added to the headspace of the vials. The $CO_2:N_2:CH_4$ portion of the gas mixtures mimicked conditions in the oil reservoir. Hydrogen or carbon monoxide provided reductant for the microbes.

Treatment #1: $H_2:CO_2:N_2:CH_4$ (1:1:1:7)
Treatment #2: $CO:CO_2:N_2:CH_4$ (1:2:3:14).

Hydrogen and carbon monoxide concentrations in the headspace were periodically analyzed. After approximately one week, concentrations of these two gases were observed to decline at a rate that required replacing the headspace gas twice weekly in order to maintain reductant concentrations. Treatment vials were incubated at 30° C. with twice-weekly headspace replacement for approximately 5 weeks.

Microbial treatments were tested after approximately 5 weeks. Cells were separated from the aqueous phase by filtration. Soluble components, including 2-naphthoic acid and products, were recovered from the aqueous phase by adsorption on solid phase extraction columns using a C-18 SPE column. Chemicals adsorbed to the SPE column were recovered as a methanol solution. Following trimethylsilane derivatization, recovered chemicals were analyzed by gas chromatography-mass spectrometry (GC-MS). Two new chemicals were observed in the experimental treatments that indicated microbial reductive transformation of 2-naphthoic acid had occurred (Table 2). In the experimental treatments supplied with hydrogen as the reductant two different reductively transformed products of 2-naphthoic acid were observed (Table 2, FIGS. 2, 3 & 4). In the experimental treatments supplied with carbon monoxide as the reductant two different reductively transformed products of 2-naphthoic acid were observed (Table 2, FIGS. 2, 3 & 4). In the absence of the parent substrate no such products were produced by the production water microbial suspension when supplied with reductants shown in the control treatments (Table 2).

TABLE 2

GC-MS results indicate microbial modification of 2-naphthoic acid

| Treatment | Gas composition | 2-naphthoic acid | Reduced Product 1 | Reduced Product 2 |
|---|---|---|---|---|
| Experimental | $H_2:CO_2:N_2:CH_4$ (1:1:1:7) | 2.5 mg | observed | observed |
| Experimental | $CO:CO_2:N_2:CH_4$ (1:2:3:14) | 2.5 mg | observed | observed |
| Control | $H_2:CO_2:N_2:CH_4$ (1:1:1:7) | Not added | Not observed | Not observed |
| Control | $CO:CO_2:N_2:CH_4$ (1:2:3:14) | Not added | Not observed | Not observed |

Example 2

Crude Oil Viscosity was Lowered by Chemical Reduction (Hydrogenation)

The Following Example Shows that Reduction, in this Case Chemical hydrogenation, of crude oil can significantly lower crude oil viscosity, making it flow more easily. Crude oil was distilled following the ASTM method 2892 ("Manual on Hydrocarbon Analysis: 6th Edition", A. W. Drews, editor, Printed by ASTM, 100 Barr Harbor Drive, West Conshohocken, Pa., 19428-2959, 1998.). 250 g of the undistilled component was combined and thoroughly mixed with 20 g of the distillation cut taken at 406 to 610 F. The viscosity (of this mixed) sample was measured as 5513 centipoise (cp) at room temperature, using a Brookfield DV-II+pro viscometer (Brookfield Engineering Laboratories, Inc., Middleboro, Mass., USA). A 50 g portion of this mix was added to 5 g of a silica supported Nickel catalyst (NiSAT-400) (Englehart, BASF Catalysts LLC, Florham Park, N.J.). This slurry was charged to a pressure vessel agitated reactor. The head space was evacuated of any air and replaced with hydrogen. The reactor was heated to 315 C and an over pressure of hydrogen of 1500 psi was maintained over the slurry. This heat and overpressure was maintained for 4 hr. After this time, heating was stopped and the pressure of the hydrogen was let off and the sample was allowed to cool. The slurry was removed from the pressure vessel and its viscosity was measured as well as its aromatic vs saturated content of the carbon and hydrogen chemical bonds using NMR. As expected there was a slight decrease in the fraction of aromatic bonds in the sample from 6.6% to 5.8% and a corresponding increase in the saturated bond content of 96.2% from 93.4% (Table 4). Despite this slight change in the chemical bond make up in the sample, the viscosity dropped nearly 37%, from 5513.6 cp in the parent material (untreated control) to 3484.9 cp in the reductively transformed (hydrogenated) product (Table 3). This viscosity change was unexpected given the small change in the chemical composition.

TABLE 3

Viscosity reduction from chemical hydrogenation.

| Sample | Temp. (C.) | Pressure (psi) | Viscosity (cP) |
|---|---|---|---|
| Untreated Control | — | — | 5513.6 |
| Test P10-4 | 315 | 1500 | 3484.9 |

TABLE 4

NMR analysis of hydrogenated samples.

| Sample | Mol % Aromatic | Mol % Aliphatic |
|---|---|---|
| Control | 6.6 | 93.4 |
| Test P10-4 | 5.8 | 96.2 |

Example 3

Prophetic

Application of the Microbial Reductive Transformation Technology to Oil Recovery The techniques demonstrated in Example 1 above can be used in field situations to improve oil recovery from subsurface oil reservoirs in situations where water flood techniques are in use.

An injection well is typically used to force water into the underground reservoir during the water flood phase of oil recovery. Periodically, amendments may be added to the injection water that encourage microbial reduction in the subsurface oil reservoir. Carbon monoxide may be introduced into the injection water by pumping under pressure through a porous frit placed in the injection water stream. The porous frit may be placed at a location in the injection well that is immediately above the depth at which injection water enters the oil reservoir formation. When needed, carbon monoxide may be pumped into the injection water at a rate of 0.3 volumes of CO per 10 volumes of injection water. An additional amendment that may be added to the injection water includes a mixture consisting of 1.0 part $KH_2PO_4$, 10 parts $NH_4Cl$ and 50 parts water. When needed, the nutrient mixture solution may be injected into the injection water at a rate of one volume of nutrient mixture per hundred volumes of injection water.

In the manner described above, carbon monoxide may be added to the injection water for approximately 3 hr, followed by a 21-hr period of no addition. This cycle is continued daily. The nutrient mixture described above is added to the injection water for approximately 3 hr, followed by a 165-hr period of no addition. This cycle is continued weekly.

These additions foster aromatic reduction by microbial populations in the oil reservoir, are expected to improved oil production. Amendment addition cycles may be continued for as long as needed to maximize oil recovery.

From the foregoing description, one skilled in the art can easily ascertain the essential characteristics of this invention and, without departing from the spirit and scope thereof, can make various changes and modifications to the invention to adapt it to various usages and conditions.

What is claimed is:

1. A method for reducing aromatic hydrocarbons in an oil well comprising;
   a) providing injection water for injection into said oil well;
   b) adding to the injection water of step (a) one or more reductants capable of reducing aromatic hydrocarbons in an oil well; and
   c) injecting the water with the one or more reductants into said oil well, wherein reduction of aromatic hydrocarbons in said oil well occurs by the action of one or more anaerobic microbial populations present in said well.

2. The method of claim 1, further comprising the step of adding nutrients to the injection water prior to injection in said well, wherein said nutrients promote growth of one or more anaerobic populations in said well.

3. The method of claim 2 wherein the added nutrient contains phosphate salts added at a rate of 0.006 to 0.03% w/w of CO wherein CO is the reductant added to the injection water.

4. The method of claim 3 wherein the phosphate salt is sodium or potassium phosphate.

5. The method of claim 2 wherein the added nutrient contains ammonium salts added at a rate of 0.06 to 0.3% w/w of CO wherein CO is the reductant added to the injection water, or 0.016% to 0.8%% or 1.6% to 8% w/w of $H_2$ wherein the reductant is $H_2$ added to the injection water.

6. The method of claim 5 wherein the ammonium salt is ammonium chloride.

7. The method of claims 1 or 2 wherein the reductants are hydrogen or carbon monoxide supplied at a concentration of about 2.0% to about 10% volume for volume of the injection water to said oil well.

8. The method of claims 1 or 2 wherein the reductants are compounds capable of biochemically producing low potential reducing equivalents.

9. The method of claim 8 wherein the reductants are selected from the group consisting of formic acid, sodium formate, 2-methoxy ethanol, sodium lactate, mandellic acid, trimethylamine and ethylene glycol.

10. The method of claims 1 or 2 wherein the reductants are added to said oil well at a rate of 0.1-2% weight for volume of the injection water.

11. The method of claim 1 where the pH of the oil well is maintained at about pH 4-9.

12. The method of claim 11 where the pH of the oil well is about 6-8.5.

13. The method of claim 1 where the temperature in the oil well is maintained at or below about 70° C.

14. The method of claim 13 where the temperature in the oil well is maintained at 25-45° C.

15. The method of claim 1 where salinity of the oil well is maintained at concentration at or below about 50 parts per thousand concentration of salinity.

16. The method of claim 15 where the salinity is at 0.5-30 parts per thousand concentration of salinity.

17. The method of claims 1 or 2, wherein the reduction of aromatic hydrocarbons in oil in said oil well reduces the viscosity of said oil.

18. The method of claim 17, wherein the oil viscosity is decreased 2- 60% of the initial viscosity.

19. The method of claim 1 wherein the reduction of aromatic hydrocarbons in oil in said oil well improves oil recovery from said well.

20. The method of claim 19, wherein the reduction oaf aromatic hydrocarbons in oil in said oil well improves oil recovery from said well by 0.5% or greater over the base recovery rate from the oil well.

21. The method of claims 1 or 2, wherein about a 1-12% reduction in the relative percentage of the aromatic carbons in the hydrocarbons is brought about by the reductive reactions of said one or more anaerobic microbial populations in said well.

22. The method of claims 1 or 2, wherein about a 1-5% increase in a relative percentage of saturated carbons in the hydrocarbons in said oil well is brought about by the reductive reactions of said one or more anaerobic microbial populations in said well.

* * * * *